United States Patent
Kaufman, Jr. et al.

[15] 3,670,132
[45] June 13, 1972

[54] ENVIRONMENTAL CONTROL SYSTEM FOR MICROWAVE PROOFER

[72] Inventors: Harold B. Kaufman, Jr., New York; Robert F. Schiffmann, Brooklyn; Ernest W. Stein, New York, all of N.Y.

[73] Assignee: DCA Food Industries Inc., New York, N.Y.

[22] Filed: July 13, 1970

[21] Appl. No.: 54,157

[52] U.S. Cl. ..................................219/10.55, 107/57 C
[51] Int. Cl. ..........................................H05b 9/06
[58] Field of Search...................219/10.55; 107/55, 57 C

[56] References Cited

UNITED STATES PATENTS

| 3,263,052 | 7/1966 | Jeppson et al. | 219/10.55 |
| 3,549,848 | 12/1970 | Williams | 219/10.55 |
| 3,474,212 | 10/1969 | White | 219/10.55 |
| 3,048,686 | 8/1962 | Schmidt | 219/10.55 |

Primary Examiner—J. V. Truhe
Assistant Examiner—Hugh D. Jaeger
Attorney—Amster & Rothstein

[57] ABSTRACT

An environmental control for a microwave cavity which provides a controlled air temperature and relative humidity in the cavity particularly suitable for use in a microwave proofer in which a yeast-leavened dough is proofed and matured by exposing dough pieces to a microwave field of an intensity and duration to elevate the temperature of the dough piece sufficient to initiate the generation and expansion of gases in the dough piece and the complete proofing thereof.

22 Claims, 7 Drawing Figures

INVENTORS.
HAROLD B. KAUFMAN, JR.
ROBERT F. SCHIFFMANN
ERNEST W. STEIN

BY Amster & Rothstein
ATTORNEYS

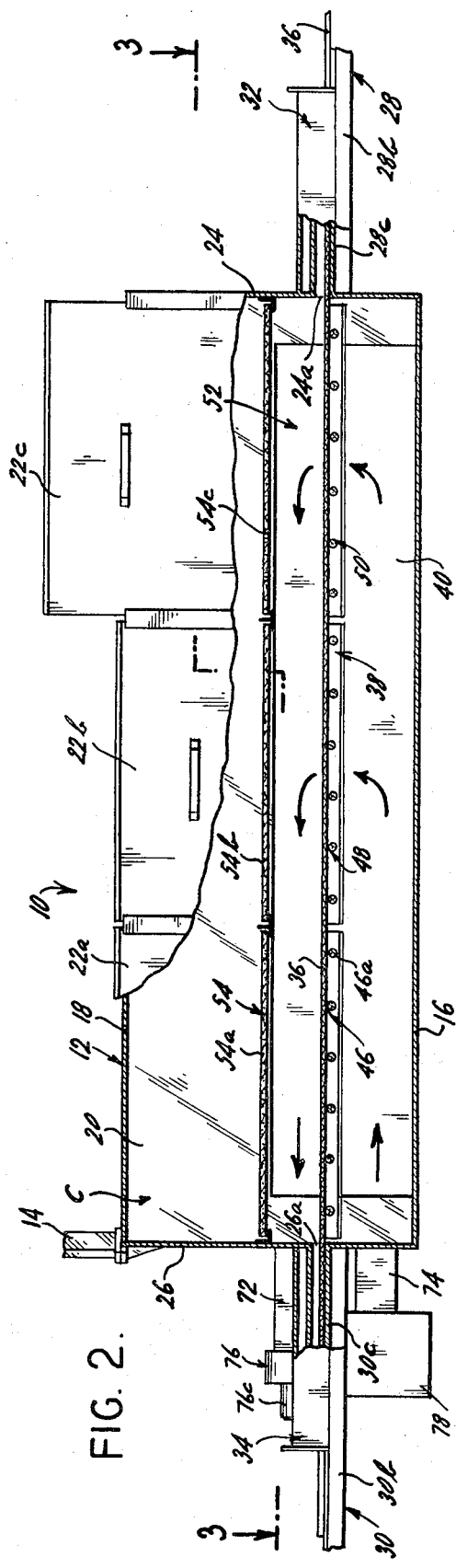
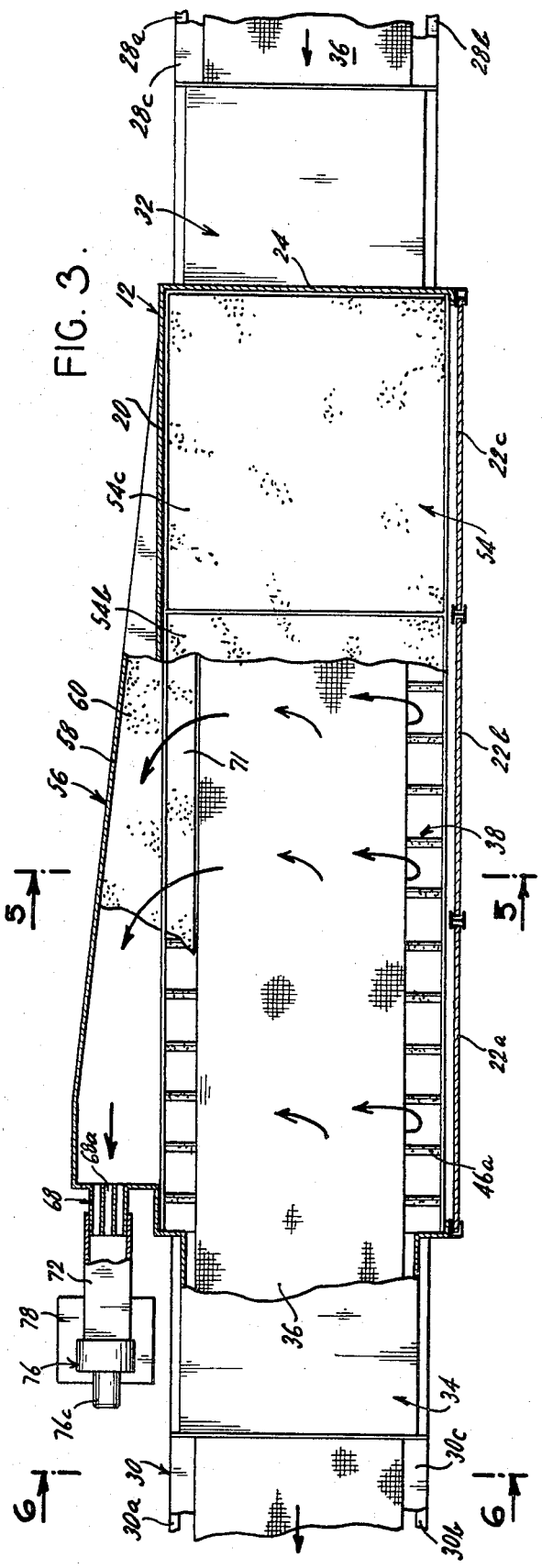

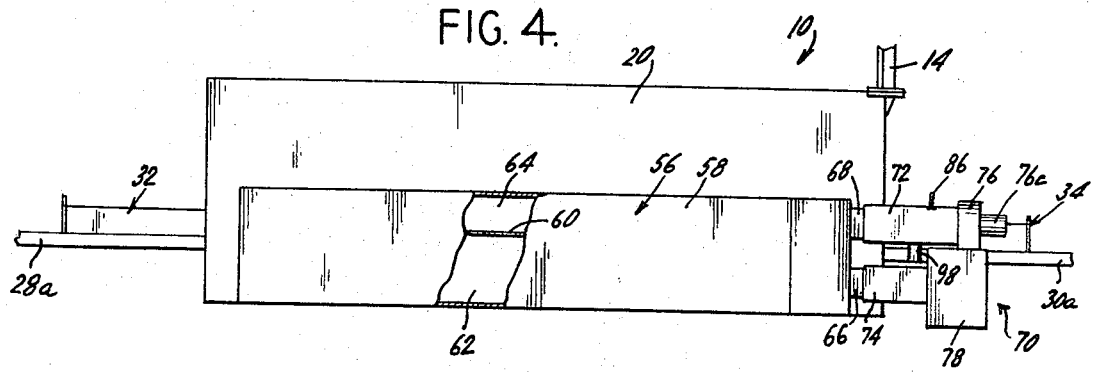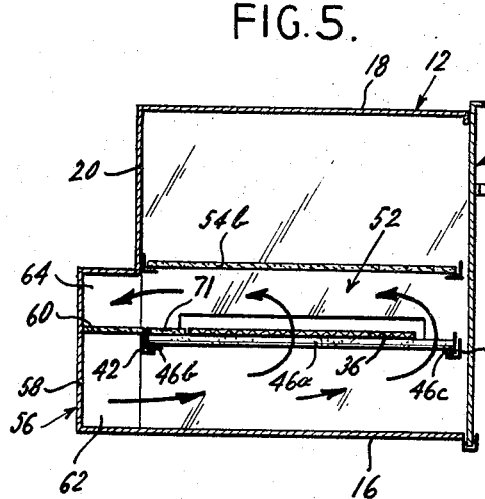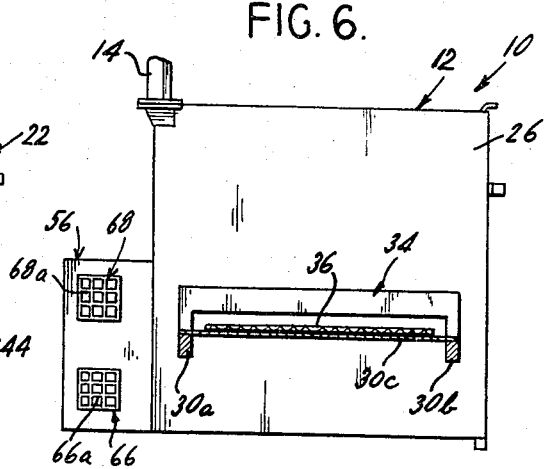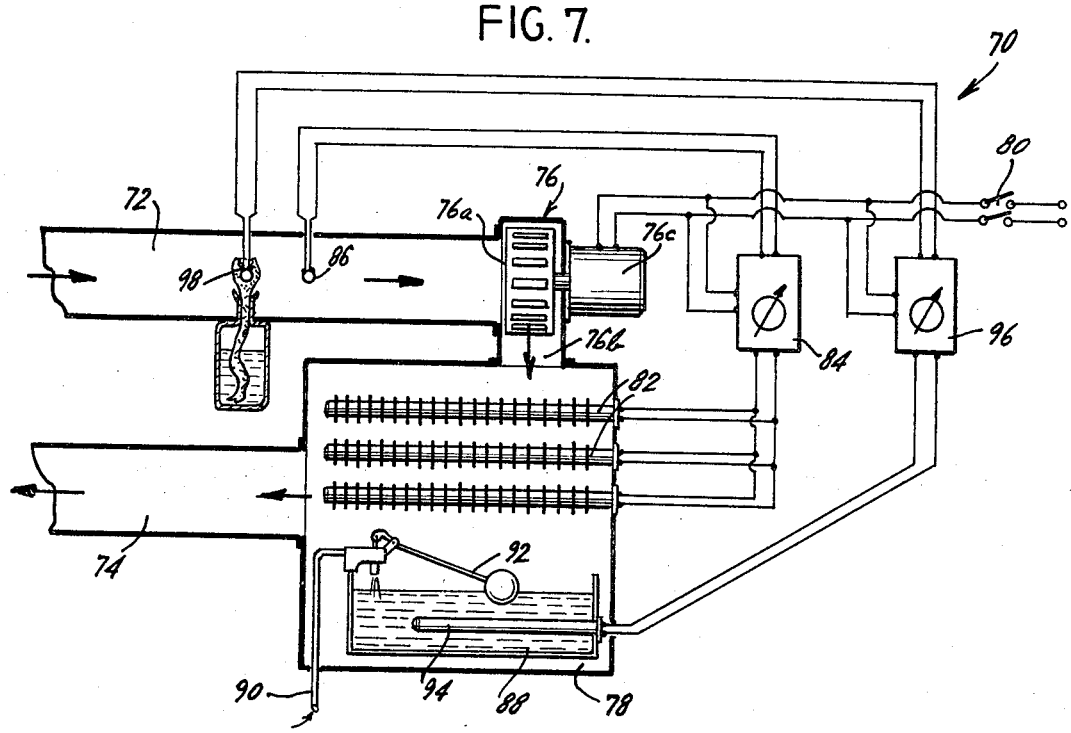

ENVIRONMENTAL CONTROL SYSTEM FOR MICROWAVE PROOFER

The present invention relates generally to a temperature and humidity control for a microwave cavity and, in particular to an environmental control for a microwave proofer in which yeast-leavened dough is exposed to an elevated temperature of an intensity and duration to initiate the generation and expansion of gases in the dough piece to achieve proofing thereof.

In the production of yeast-raised bakery products, such as yeast-raised doughnuts, a yeast-containing dough mass of suitable composition is worked by kneading at room temperature to develop the gluten to an optimum viable state. The dough mass is then divided into pieces of the desired shape and size and the pieces are stored under closely controlled ambient conditions of temperature and humidity for a period of the order of about 15 to 75 minutes to cause the desired raising of the dough as a consequence of the generation and expansion of gases in the dough due to the yeast and enzymatic activity and to produce other desired effects. In large commercial operations, the production of the baked product is achieved in a continuous manner and proofing is accomplished by depositing groups of the dough pieces onto consecutive trays and transporting the successive trays through a proofing chamber or cabinet maintained under controlled conditions of humidity and temperature. This procedure possesses many drawbacks and disadvantages and, accordingly, as described in copending application Ser. No. 51,545, entitled "Dough Proofing Apparatus," there is provided apparatus for proofing and maturing the yeast-leavened dough which includes a cavity for exposing a dough piece to a microwave field of an intensity and duration to elevate the temperature of the dough piece sufficient to initiate the generation and expansion of gases in the dough piece and the proofing thereof. In typical apparatus, the microwave cavity has entry and exit ports and is provided with a conveyor for transporting products to be exposed to energy in the microwave cavity from a pickup point external to the entry port, through the cavity and along an exposure path to a drop-off point external to the exit port. In this equipment, it is necessary to provide means for controlling air temperature and relative humidity conditions in a manner compatible with the simultaneous application of the microwave energy and sound bakery production practices. The control of temperature and humidity is important in that the application of microwave energy alone to the dough proofing process does not achieve desired product skin characteristics which is important to achieving a high order of product quality and uniformity. Further, such temperature and humidity control must be achieved in a manner wherein there is substantially no undesirable microwave attenuation or interaction with the conveying and/or environmental control structures, in a manner compatible with good sanitary practices, and in a manner which affords adequate personnel safety and which complies with the regulations of government agencies dealing with the commercial utilization of microwave energy for food processing.

Broadly, it is an object of the present invention to provide an environmental control for a microwave cavity which realizes one or more of the aforesaid objectives. More particularly, it is among the objectives of the present invention to provide a microwave proofer wherein precise adjustment and maintenance of air temperature and relative humidity may be realized during the microwave treatment of the food product; wherein provision is made for conveying food products through the treatment chamber at the desired production rates without affecting or interfering with the exposure of the food products to the microwave energy; wherein a controlled air flow is established which uniformly contacts the exterior surfaces of the food product during its residence time in the treatment chamber and during its concomitant exposure to the microwave field; wherein effective isolation of the environmental control is achieved without impeding either the effectiveness of the environmental control or the air flow to and from the treatment chamber under conditions which afford adequate personnel safety and complete compliance with corresponding safety regulations; wherein an economical and efficient environmental control is provided which assures that the temperature and humidity controlled air is constantly recirculated through the treatment chamber with minimal air leakage from the entry and exit ports required to introduce and remove the food products from the treatment chamber; and wherein a total environmental control is provided incorporating the necessary air control and microwave capability which is suitable for manufacture on a mass production basis and is easily installed, operated and maintained by typical personnel found in a commercial bakery.

In accordance with an illustrative embodiment demonstrating objects and features of the present invention, there is provided an enclosure which defines the microwave cavity having entry and exit ports, with provision for establishing within the cavity a microwave field of an intensity and duration to elevate the temperature of the dough pieces passing through the treatment chamber afforded by the microwave cavity in accordance with the principles disclosed and described in said copending application. A conveyor is arranged for transporting the food products to be exposed to the microwave energy into the microwave cavity from a pickup point external to the entry port through the cavity and along an exposure path and to a drop-off point external to the exit port. Means are provided within the cavity defining a product treatment zone along the exposure path which is limited in at least its vertical dimension and through which the conveyor passes. Provision is made at one of the under and top sides of the treatment zone for introducing air under controlled temperature and relative humidity to the treatment zone and means are provided at the other of the under and top sides which is pervious to microwave energy to provide an air baffle for the treatment zone which is capable of directing the temperature and relative humidity controlled air in the requisite circulation path without interfering with the exposure of the food products to the microwave energy in the product treatment zone.

The above brief description, as well as further objects, features and advantages of the present invention will be more fully appreciated by reference to the following detailed description of a presently preferred, but nonetheless illustrative embodiment demonstrating objects and features of the present invention, when taken in conjunction with the accompanying drawings, wherein:

FIG. 2 is a side elevational view, taken from the right of FIG. 1 and with part broken away and sectioned showing the microwave proofer, with one of the side access panels lifted to a partially opened position;

FIG. 3 is a sectional view taken substantially along the line 3—3 of FIG. 2 and looking in the direction of the arrows, with parts broken away;

FIG. 4 is a side elevational view taken from the left side of FIG. 1, on a reduced scale and with parts broken away;

FIG. 5 is a sectional view taken substantially along the line 5—5 of FIG. 3 and looking in the direction of the arrows;

Figure 1:
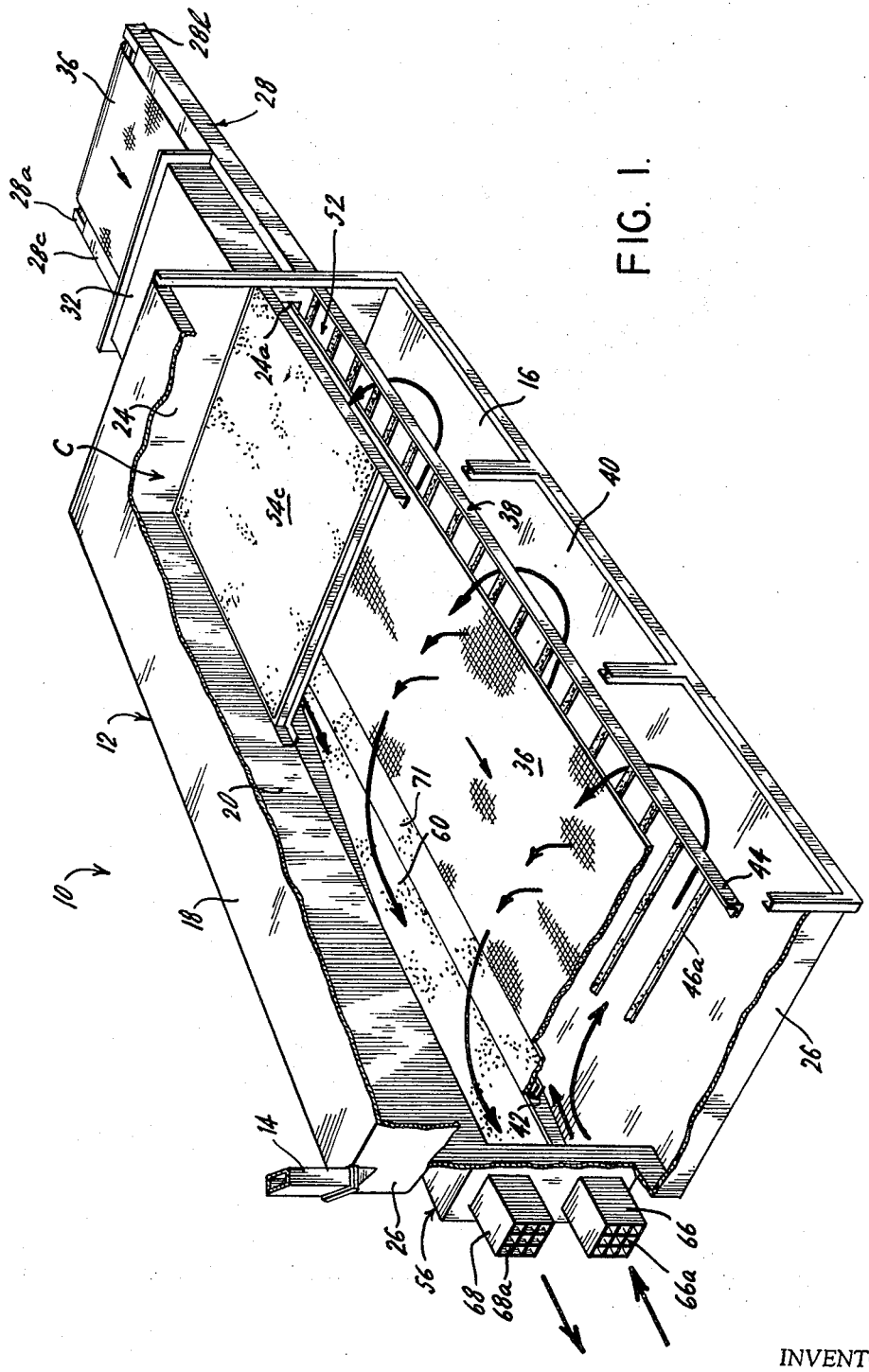
FIG. 1 is a perspective view, with part broken away and sectioned showing a microwave proofer embodying features of the present invention.

FIG. 6. is an elevational view taken substantially along the line 6—6 of FIG. 3 and looking in the direction of the arrows; and FIG. 7 is a diagrammatic and schematic showing of a typical air generator with provision for temperature and humidity control to be employed in conjunction with the microwave proofer shown in FIG. 1.

Referring now specifically to the drawings and in particular to FIGS. 1–6, inclusive, there is shown a typical proofer embodying features of the present invention and generally designated by the reference numeral 10 which includes an elongated housing 12 providing a microwave cavity C. Provision is made from an appropriate microwave generator (not shown) via an appropriate coupling, such as connecting wave guide 14, for introducing microwave energy into cavity C in the dielectric heating range preferably between 1 and 100,000 megacycles and typically at 2,450 megacycles. For further details of the establishment of the microwave field and its purpose, reference may be made to said copending application.

The housing or enclosure 12 may be fabricated in any convenient fashion in accordance with techniques generally understood for establishing microwave cavities, with the housing 12 including bottom wall 16, top wall 18, left and right side walls 20, 22, and leading and trailing end walls 24, 26. In this illustrative embodiment, side wall 22 is made up of plural vertically slidable access panels 22a, 22b, 22c (see FIG. 2), each provided with appropriate hand grips and slidably supported in appropriate guideways formed in the framing structure for the housing 12. The slidable side panels permit access to the microwave cavity C and the environmental control system components therein for the purposes of initial installation and subsequent cleaning, servicing, repair and inspection.

Projecting outwardly from end wall 24 of housing 12 is an entry end conveyor supporting extension 28 (see FIGS. 1–3); and projecting outwardly from end wall 26 is an exit end conveyor supporting extension 30. Supporting extensions 28, 30 are substantially at the level of the corresponding entry and exit ports 24a, 26a formed in end walls 24, 26 and typically include spaced side bars 28a, 28b (and 30a, 30b) supporting respective horizontal belt-supporting platforms 28c (and 30c). Further, there is provided an entry trap or tunnel 32 which projects from entry port 24a and an exit trap or tunnel 34 which projects from exit port 26a. Tunnels or traps 32, 34 serve to reduce and substantially eliminate the leakage of microwave energy from cavity C and may take a variety of structures, as disclosed in copending application Ser. No. 51,531 entitled "End Trap for Microwave Oven" (P-28) which application is assigned to the assignee of the instant application. For the present purposes, it will suffice to point out that the tunnels 32, 34 are supported on the respective extensions 28, 30 and cooperate with platforms 28c, 30c at the levels of the lower edge of the entry and exit ports 24a, 26a to establish a horizontal supporting plane along which belt 36 of a conventional conveyor passes. The food product to be exposed to the proofer 10 is delivered to the drop-off point external to entry port 24a in advance of the tunnel 32 and onto the moving conveyor belt 36 such that the food products may enter through tunnel 32 and port 24, pass through cavity C along an exposure path defined by the horizontal plane along which the belt 36 moves and exit through the port 26a and tunnel 34 to an external drop-off point from which the proofed food products may be delivered to a continuous deep frying unit, for example, of the type shown in U.S. Pat. No. 2,709,955 of June 7, 1955.

Disposed within the cavity C in substantially coplanar relation to the belt supporting extensions 28, 30 is a multisection and open belt-supporting assembly 38 which extends in spaced parallel relation to bottom wall 16 and cooperates therewith and with the adjacent side and end wall portions of the housing 12 to define an air plenum 40. Belt-supporting assembly 38 includes fixed support rails 42, 44, typically of angle iron, secured as by welding to the housing at the appropriate level above bottom wall 16. Fixed support rails 42, 44 receive and support the removable open belt-supporting platforms 46, 48, 50 arranged in end-to-end relation and each length enabling removal thereof upon lifting of the adjacent slidable access panels 22a, 22b, 22c of the side wall 22. Each belt-supporting platform in turn includes plural spaced transversely extending cross bars or slats, such as 46a, fabricated of a microwave-pervious or transparent material (i.e., easily cleanable polypropylene) which has the requisite heat-resisting properties, with the cross bars or slats 46a appropriately attached at their opposite ends to side bars 46b, 46c which may be conveniently fabricated of angle iron. It will be appreciated that this arrangement provides adequate support for the belt 36, yet permits air flow therethrough (presuming the belt 36 is porous) from the plenum 40 and provides a structure which can be quickly and easily dismantled for cleaning of the belt-supporting structure as well as the interior of the microwave cavity.

The plural end-to-end and coplanar belt-supporting platforms 46, 48, 50 define the lower wall or side of a confined treatment zone 52 which extends between the inlet port 24a and the exit port 26a. The upper side or wall of the treatment zone 52 is defined by an air baffle 54 which is transparent to microwave energy and serves to direct air which passes up from the plenum 40 toward a lateral location extending along one side of the treatment zone 52. At the lateral location, there is provided a manifold 56 for circulating air at the controlled temperature and humidity. The air baffle 54 effectively restricts the volume of the operative portion of the microwave cavity which receives the conditioned air, thus reducing capacity requirements of the environment control system, particularly during startup. The air baffle 54 includes plural sections 54a, 54b, 54c fabricated of a flat rigid sheet stock, such as polypropylene, sized to be removable through the slidable access panels 22a, 22b, 22c. These air baffles or barriers serve to contain the recirculating controlled air within the treatment zone or space 52 through which the product passes and also serves to isolate the upper section of the microwave cavity C from the products zone in accordance with sound sanitary practices. Barrier 54 must be transparent to microwave energy in order not to interfere with the transmission of microwave power into the treatment zone 52.

The manifold 56 of the environment control system includes a manifold housing 58 which is formed on or attached to the housing 12 and includes an immediate and horizontally extending barrier or baffle 60 which is substantially coplanar with belt 36 (see FIG. 5) and serves to divide the internal chamber of the manifold 56 into a lower section or tier 62 and an upper section or tier 64. A manifold inlet 66 communicates with the lower section or tier 62 and provides for the ingress of air under controlled temperature and humidity conditions, which air passes into the plenum 40, then follows the illustrative flow paths indicated by the directional arrows in the several figures and passes to the upper section or tier 64 for egress through the manifold outlet 68. The air control generator associated with the inlet and outlets 66, 68 will be described in conjunction with FIG. 7 and is shown in outline in FIGS. 2 and 3 and generally designated by the reference numeral 70.

Intermediate the air impervious and microwave transparent barrier 60 of the manifold 56 and belt 36, there is provided a belt-support barrier or baffle 71 which fills the space between barrier 60 and belt 36 along the length of the manifold 56 to assure that the air flow will be directed to the opposite side of the belt 36 and into the treatment zone, and when the belt is porous, also through the belt 36 into the treatment zone 52. Belt-support barrier 71 likewise is pervious to microwave energy to avoid the establishment of any undesired modes or losses within cavity C.

Presuming that a humidified and heated air source is attached to the manifold inlet 66, it will be appreciated that such air flows into the lower or bottom section 62 of the manifold and then laterally underneath belt 36 to the several lateral locations indicated by the directional arrow including the opening at the side of belt 36 remote from barrier 71, which barrier rests on the belt-supporting assembly 48. Air is exhausted across the top of belt 36 and through the treatment zone 52 whereupon it enters the upper section or tier 64 of the manifold 56 and then flows through the upper manifold section 64 to the manifold outlet 68 for return to the controlled air generator 70, to be described.

The air flow is contained in the treatment or product zone 52 by the air barrier 54. Since the end trap ports or openings 24a, 26a are above the belt 36 and in approximately the same plane as the forced air exhaust into upper section 64 of the manifold 56, air loss through the entry and exit ports 24a, 26a and the corresponding tunnels 32, 34 is minimized. Insofar as the air plenum 40 is concerned, there are no openings beneath belt 36 and, accordingly, there is no potential for air loss in this region of the housing 12.

Provision is made within the manifold inlet and outlet 66, 68, respectively, to isolate the microwave energy within the cavity C. This may be accomplished in a variety of ways in accordance with principles well understood in the microwave field provided that the means employed for preventing the microwave power from escaping from the cavity C does not interfere with the required air flow. In the illustrated example, microwave traps 66a, 68a are in the form of an egg crate design in which the partitions provide a plurality of microwave wave guides of dimensions in respect to the wave lengths being utilized which preclude the microwave energy from exiting the cavity C. In lieu of the egg crate design, the manifold inlet and outlet port traps may be constructed of clusters of tubes of circular cross-section, as is generally understood.

The controlled-air generator 70 is shown in one preferred form in FIG. 7 and is seen to include a blower inlet duct 72 which is adapted to be connected to the manifold outlet 68 and a blower outlet duct 74 adapted to be connected to the manifold inlet 66 (see FIGS. 2 and 3). Essentially, the controlled-air generator 70 includes a centrifugal blower 76 having its suction side 76a connected to the blower inlet duct 72, and its outlet side 76b connected to a heating and humidifying chamber 78. The motor 76c of blower 76 is connected to an appropriate source of AC power over main switch 80. Within the heating and humidifying chamber 78, there is provided a plurality of electric air heaters 82 which are of essentially conventional construction. Heaters 82 are connected to the power line over switch 80 through a thermostatic control 84 which includes a heat sensor 86 in the blower inlet duct 72. Since the details of the heater 82, its thermostatic control 84, and its sensor 86 are well understood to those skilled in the control art, further description is dispensed with. Additionally, chamber 78 includes a water tank 88 which receives water from inlet pipe 90 through level control 92, with the water being heated by an electric heater 94 energized from the main power line over thermostatic control 96 which in turn is connected to humidity sensor 98 in the blower inlet duct 72. Here again the details of the control are well understood and it suffices to point out that the controlled-air generator 70 exhausts the air from the upper tier or section 64 of manifold 56 due to the action of blower 76 and passes the exhaust air through duct 72 and into heating and humidifying chambers 78 wherein the air is subjected to the controlled atmosphere established by the air heaters 82 and the immersion water heater 94, with the temperature and humidity being automatically maintained in accordance with the wet bulb and dry bulb temperatures as sensed at 98, 86. Since water is continuously evaporating from tank or pan 88 due to the heating of the immersion heater 94, the water level is constantly replenished by the level control 92. Also, since the wet bulb sensing element 98 requires continuous wetting as it functions, this is accomplished by the provision of a wick and an appropriate water supply. In summary, the recirculating air is heated to a preset temperature as it passes through chamber 78; and a preset wet bulb temperature is maintained by evaporation of water from the tank 88 through the heat supplied by immersion heater 94. Typically, the temperature conditions within the product zone may range from 90° to 140° F., with the relative humidity varying from 25 to 90 percent, depending upon the other significant parameters of the microwave proofer for any preset operating conditions.

From the foregoing, it will be appreciated that there has been provided in accordance with the present invention a practical and convenient means for establishing a controlled air temperature and relative humidity in a microwave proofer which is entirely compatible with the operation of the microwave proofer and requirements imposed for servicing and cleaning in a typical bakery environment. Precise adjustability and maintenance of air temperature and relative humidity achieves the desired proofing and skin characteristics for the product during the microwave treatment; and the product is uniformly contacted with the controlled air flow during its travel through the microwave field. The conveyor is supported as it passes through the field without undesired microwave power interaction or attenuation and the conveyor system itself, as well as the related air baffles and supports can be readily cleaned, by the simple expedient of removing the support baffle sections through slidable side panels provided in the cavity housing. The equipment realizes the several requirements for microwave proofing on a mass production basis and provides a high degree of control over the temperature and humidity of the air, all in a manner readily handled and serviced by comparatively unskilled personnel.

A latitude of modification, change and substitution is intended in the foregoing disclosure, and in certain instances some features of the invention will be used without a corresponding use of other features. Accordingly, it is appropriate that the appended claims be construed broadly and in a manner consistent with the spirit and scope of the present invention.

What we claim is:

1. In a microwave system, an enclosure defining a microwave cavity having entry and exit ports, a conveyor for transporting products to be exposed to energy in said microwave cavity from a pickup point external to said entry port, through said cavity along an exposure path and to a drop-off point external to said exit port, means within said cavity defining a product treatment zone along said exposure path through which said conveyor passes, means at one of the under and top sides of said treatment zone for introducing air under controlled temperature and relative humidity to said treatment zone, means pervious to microwave energy at the other of the under and top sides of said treatment zone providing an air baffle and baffle means dividing the means for introducing air into said treatment zone into lower and upper sections.

2. A microwave system according to claim 1 wherein the means for introducing air into said treatment zone includes a plenum at the under side thereof and said air baffle is at the top side thereof.

3. A microwave system according to claim 2 wherein said conveyor includes a porous belt permitting air flow therethrough.

4. A microwave system according to claim 3 wherein the means defining said treatment zone includes a belt-supporting system at said under side over which said belt passes, said belt-supporting system including a plurality of spaced and transversely extending supporting bars of microwave transparent material.

5. A microwave system according to claim 4 wherein the means for introducing air into said treatment zone further includes an air manifold in communication with said plenum and disposed along the longitudinal extent of said treatment zone.

6. A microwave system according to claim 5 wherein said air manifold includes a portion of said baffle means dividing the same into said lower and upper sections, said lower section communicating with said plenum and said upper section communicating with said treatment zone.

7. A microwave system according to claim 6 wherein said baffle means is transparent to microwave energy and is disposed in substantially coplanar relation to said belt.

8. A microwave system according to claim 7 including a manifold inlet communicating with said lower section and a manifold outlet communicating with said upper section.

9. A microwave system according to claim 8 including respective microwave traps in said manifold inlet and outlet.

10. A microwave proofer for food products comprising an elongated housing providing a microwave cavity and having an entry port at one end thereof and an aligned exit port at the opposite end thereof, belt-supporting means on said housing extending between said entry and exit ports, said belt-supporting means being pervious to microwave energy and cooperating with said housing to define an air plenum therebeneath, a conveyor for transporting food products through said cavity including an air-pervious belt extending into said entry port, resting upon said belt-supporting means in said microwave cavity and extending out of said exit port, an air baffle on said housing extending between said entry and exit ports and in spaced relation above said belt and cooperating therewith to define a treatment zone extending between said entry and exit ports, said air baffle being impervious to air but pervious to microwave energy such as to direct air to a lateral location along the length of said treatment zone yet permit exposure of food products on said belt to microwave energy in said cavity, means for introducing air at a controlled temperature and humidity into said air plenum for passage into said treatment zone and toward said lateral location, an air manifold along the length of said treatment zone and said air plenum at said lateral location and a manifold baffle to separate said air manifold into sections.

11. A microwave proofer according to claim 10 including access means in said elongated housing and wherein said belt-supporting means is in multiple sections sized for removal through said access means.

12. A microwave proofer according to claim 11 wherein said air baffle is in multiple sections sized for removal through said access means.

13. A microwave proofer according to claim 10 wherein said belt-supporting means includes an open framework of a width in excess of the width of said belt.

14. A microwave proofer according to claim 10 wherein said air manifold includes a lower section having a manifold inlet and communicating with said air plenum and an upper section having a manifold outlet and communicating with said treatment zone.

15. A microwave proofer according to claim 14 including said manifold baffle intermediate said upper and lower sections, said manifold baffle being impervious to air and pervious to microwave energy.

16. A microwave proofer according to claim 15 including air heating and humidifying means and a blower having its suction side connected to said manifold outlet and its pressure side connected to said manifold inlet.

17. A microwave proofer according to claim 16 including temperature and humidity sensing means between air manifold outlet and the suction side of said blower and respective means responsive to said sensing means and controlling said air heating and humidifying means respectively for conditioning air at the pressure side of said conveyor in advance of passage thereof to said manifold inlet.

18. A microwave proofer for food products comprising an elongated housing providing a microwave cavity and having an entry port at one end thereof and an exit port at the opposite end thereof, belt-supporting means on said housing extending between said entry and exit ports, said belt-supporting means being pervious to microwave energy and cooperating with said housing to define an air plenum therebeneath, a conveyor for transporting food products through said cavity including a belt extending into said entry port, overlying and resting upon said belt-supporting means and extending out of said exit port, an air baffle in said housing extending between said entry and exit ports and in spaced relation above said belt and cooperating therewith to define a treatment zone from said entry port to said exit ports, said air baffle being impervious to air but pervious to microwave energy such as to direct air entering said treatment zone to a lateral location along one side of said treatment zone yet permit exposure of food products on said belt to microwave energy in said cavity, means for introducing air at a controlled temperature and humidity into said air plenum for passage into said treatment zone at the other side thereof and toward said lateral location, an air manifold along the length of said treatment zone and said air plenum at said lateral location and a manifold baffle to separate said air manifold into sections.

19. A microwave proofer according to claim 18 wherein said belt-supporting means includes an open framework of a width in excess of the width of said belt and a side air baffle overlying said belt-supporting means and adjacent said conveyor along said one side of said treatment zone for directing air toward the other side thereof for passage from said air plenum into said treatment zone.

20. A microwave proofer according to claim 19 wherein said air manifold includes a lower section having a manifold inlet and communicating with said air plenum, an upper section having a manifold outlet and communicating with said treatment zone and said manifold baffle being intermediate said upper and lower sections and adjacent said side air baffle, said manifold baffle being impervious to air and pervious to microwave energy and cooperating with said side air baffle for directing air toward said other side of said treatment zone.

21. A microwave proofer according to claim 20 including air heating and humidifying means and a blower having its suction side connected to said manifold outlet and its pressure side connected to said manifold inlet.

22. A microwave proofer according to claim 21 including temperature and humidity sensing means between air manifold outlet and the suction side of said blower and respective means responsive to said sensing means and controlling said air heating and humidifying means respectively for conditioning air at the pressure side of said conveyor in advance of passage thereof to said manifold inlet.

* * * * *